(12) United States Patent
Choi et al.

(10) Patent No.: US 11,481,039 B2
(45) Date of Patent: Oct. 25, 2022

(54) SYSTEM FOR RECOGNIZING USER HAND GESTURE AND PROVIDING VIRTUAL REALITY CONTENT BASED ON DEEP LEARNING USING TRANSFER LEARNING

(71) Applicant: Electronics and Telecommunications Research Institute, Daejeon (KR)

(72) Inventors: Yeong Jae Choi, Daejeon (KR); Seung Joon Kwon, Gyeonggi-do (KR); Sang Woo Seo, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 17/327,277

(22) Filed: May 21, 2021

(65) Prior Publication Data
US 2022/0066566 A1    Mar. 3, 2022

(30) Foreign Application Priority Data

Aug. 28, 2020  (KR) .......................... 10-2020-0109069
Nov. 19, 2020  (KR) .......................... 10-2020-0155703

(51) Int. Cl.
| | | |
|---|---|---|
| *G06T 15/08* | (2011.01) | |
| *H04N 5/369* | (2011.01) | |
| *G06F 3/01* | (2006.01) | |
| *G06N 20/00* | (2019.01) | |
| *G06K 9/62* | (2022.01) | |

(52) U.S. Cl.
CPC .............. *G06F 3/017* (2013.01); *G06F 3/014* (2013.01); *G06F 3/016* (2013.01); *G06K 9/6215* (2013.01); *G06K 9/6256* (2013.01); *G06N 20/00* (2019.01)

(58) Field of Classification Search
None
See application file for complete search history.

(56) References Cited

U.S. PATENT DOCUMENTS

| | | | | |
|---|---|---|---|---|
| 2014/0306891 | A1* | 10/2014 | Latta ....................... | G06F 3/011 |
| | | | | 345/158 |
| 2018/0286105 | A1* | 10/2018 | Surti ...................... | G06T 15/005 |
| 2019/0147640 | A1* | 5/2019 | Surti ...................... | G06V 40/19 |
| | | | | 345/473 |
| 2020/0104714 | A1 | 4/2020 | Lee | |
| 2020/0167554 | A1* | 5/2020 | Wang .................... | G06K 9/6292 |
| 2020/0184310 | A1 | 6/2020 | Chung et al. | |

FOREIGN PATENT DOCUMENTS

| | | |
|---|---|---|
| KR | 10-2046706 | 11/2019 |
| KR | 10-2179999 | 11/2020 |

\* cited by examiner

*Primary Examiner* — Carl Adams
(74) *Attorney, Agent, or Firm* — Kile Park Reed & Houtteman PLLC

(57) ABSTRACT

Provided is a system for recognizing a user hand gesture and providing virtual reality content based on deep learning using transfer learning. The system includes a head mounted display (HMD) configured to display, to a user, virtual reality content based on a hand gesture, a hand gesture sensor configured to acquire hand data of the user, and a controller device configured to receive the hand data and convert the received hand data into hand gesture data, manage a hand gesture recognizer on the basis of deep learning, and perform content execution management.

17 Claims, 5 Drawing Sheets

SYSTEM FOR RECOGNIZING USER HAND GESTURE AND PROVIDING VIRTUAL REALITY CONTENT BASED ON DEEP LEARNING USING TRANSFER LEARNING

CROSS-REFERENCE TO RELATED APPLICATION

This application claims priority to and the benefit of Korean Patent Application No. 10-2020-0109069, filed on Aug. 28, 2020, and Korean Patent Application No. 10-2020-0155703, filed on Nov. 19, 2020, the disclosure of which is incorporated herein by reference in its entirety.

BACKGROUND

1. Field of the Invention

The present invention relates to a system for recognizing a user hand gesture and providing virtual reality content based on deep learning using transfer learning.

2. Discussion of Related Art

Systems for providing virtual reality content according to the related art have a limitation hindering user's content immersion due to a difference between an action performed by a user in a real environment and an action performed by a user in a virtual environment.

In addition, an attempt to match the above-described user's actions in the real environment and the virtual environment causes a long time and cost in a process of acquiring user hand data and training a deep learning-based user hand gesture recognizer.

SUMMARY OF THE INVENTION

The present invention is directed to providing a system for providing virtual reality content capable of, in order to provide a user hand gesture-based virtual reality service, generating and managing a deep learning-based user hand gesture recognizer using transfer learning and applying the deep learning-based user hand gesture recognizer to virtual reality content.

The technical objectives of the present invention are not limited to the above, and other objectives may become apparent to those of ordinary skill in the art based on the following description.

According to one aspect of the present invention, there is provided a system of recognizing a user hand gesture and providing virtual reality content based on deep learning using transfer learning, the system including: a head mounted display (HMD) configured to display, to a user, virtual reality content based on a hand gesture; a hand gesture sensor configured to acquire hand data of the user; and a controller device configured to receive the hand data and convert the received hand data into hand gesture data, manage a hand gesture recognizer on the basis of deep learning, and perform content execution management.

The hand gesture sensor may transmit the hand data, which is acquired using at least one of a camera disposed on a front surface of the HMD, a data glove worn by the user, a thimble worn by the user, or a separately disposed camera, to the controller device.

The controller device may transmit and receive the hand data and haptic data to and from the hand gesture sensor.

The controller device may perform accumulation and interpolation on a different piece of the hand data to convert the different piece of the hand data into the hand gesture data.

The controller device may output a recognition result according to a presence or absence of the hand gesture recognizer that derives a hand gesture recognition result using the hand gesture data.

The controller device, in response to a result output of absence of the hand gesture recognizer with respect to the hand gesture data, may execute content for generating a deep learning-based user hand gesture recognizer using transfer learning.

The controller device may compare a similarity between the hand gesture data and existing hand gesture datasets to select a candidate dataset to be used for the transfer learning and may use a similarity comparison analysis result value of the candidate dataset to construct a new hand gesture dataset to perform learning on the deep learning-based hand gesture recognizer or select a candidate user hand gesture recognizer and construct a partial user hand gesture dataset to be used for transfer learning.

The controller device, in response to output of the hand gesture recognition result for the hand gesture data, may execute hand gesture recognition-based user content.

The controller device may use latest user hand data of the hand gesture data to render a hand in the content.

According to another aspect of the present invention, there is provided a method of recognizing a user hand gesture and providing virtual reality content based on deep learning using transfer learning, the method including the steps of: (a) receiving hand data and converting the received hand data into hand gesture data; (b) identifying whether a suitable hand gesture classifier exists using the hand gesture data; and (c) when it is identified in the step (b) that the suitable hand gesture classifier does not exist, executing content for generating deep learning-based hand gesture recognizer using transfer learning, and when it is identified in the step (b) that the suitable hand gesture classifier exists, executing hand gesture recognition-based user content.

According to another aspect of the present invention, there is provided an apparatus for recognizing a user hand gesture and providing virtual reality content based on deep learning using transfer learning, the apparatus including: an inputter configured to receive hand data; a memory in which a program for providing virtual reality content using the hand data is stored; and a processor configured to execute the program, wherein the processor receives the hand data and converts the received hand data into hand gesture data, manages a hand gesture recognizer on the basis of deep learning, and performs content execution management.

The hand data may be acquired using at least one of a camera disposed on a front surface of a head mounted display (HMD), a data glove worn by a user, a thimble worn by a user, or a separately disposed camera.

The processor may perform accumulation and interpolation on a different piece of the hand data to convert the different piece of the hand data into the hand gesture data.

The processor may output a recognition result according to a presence or absence of the hand gesture recognizer that derives a hand gesture recognition result using the hand gesture data.

The processor, in response to a result output of absence of the hand gesture recognizer with respect to the hand gesture data, may execute content for generating a deep learning-based user hand gesture recognizer using transfer learning.

The processor may compare a similarity between the hand gesture data and existing hand gesture datasets to select a candidate dataset to be used for the transfer learning and may use a similarity comparison analysis result value of the candidate dataset to construct a new hand gesture dataset to perform learning on the deep learning-based hand gesture recognizer or select a candidate user hand gesture recognizer and construct a partial user hand gesture dataset to be used for transfer learning.

The processor, in response to output of the hand gesture recognition result for the hand gesture data, may execute hand gesture recognition-based user content.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
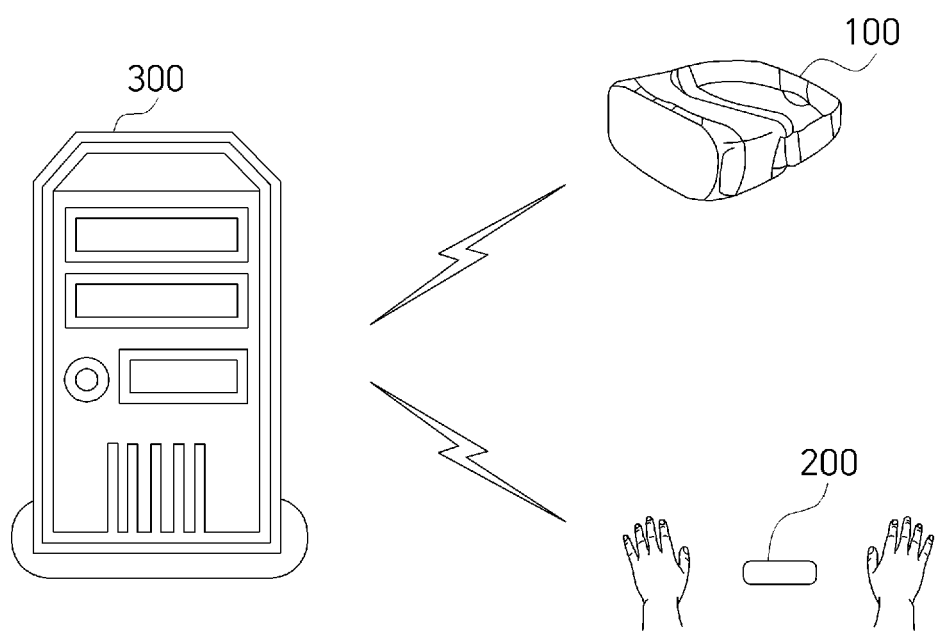
FIGS. 1 and 2 illustrate a system for recognizing a user hand gesture and providing virtual reality content based on deep learning using transfer learning according to an embodiment of the present invention.

Hereinafter, the above and other objectives, advantages, and features of the present invention and ways of achieving them will become readily apparent with reference to descriptions of the following detailed embodiments in conjunction with the accompanying drawings.

However, the present invention is not limited to such embodiments and may be embodied in various forms. The embodiments to be described below are provided only to assist those skilled in the art in fully understanding the objectives, configurations, and the effects of the invention, and the scope of the present invention is defined only by the appended claims.

Meanwhile, terms used herein are used to aid in the explanation and understanding of the embodiments and are not intended to limit the scope and spirit of the present invention. It should be understood that the singular forms "a," "an," and "the" also include the plural forms unless the context clearly dictates otherwise. The terms "comprises," "comprising," "includes," and/or "including," when used herein, specify the presence of stated features, integers, steps, operations, elements, components and/or groups thereof and do not preclude the presence or addition of one or more other features, integers, steps, operations, elements, components, and/or groups thereof.

Before describing the embodiments of the present invention, the background for proposing the present invention will be described first for the sake of understanding of those skilled in the art.

Virtual reality device developers, such as Oculus and HTC, have developed virtual reality devices based on a head-mounted display (HMD) and a holdable controller at an affordable price for consumers, and virtual reality content developers, such as Beat Games that manufactured Beat Saber games, have developed virtual reality content using such virtual reality devices, and thus virtual reality systems are being used in various fields recently.

While a user is experiencing virtual reality content based on a HMD and a holdable controller, an interaction between a user and content/a user and a virtual object is achieved through the holdable controller.

For example, an action of selecting a user menu displayed by the virtual reality content is achieved by ① the user moving the holdable controller to ② overlap a virtual hand in the virtual reality content corresponding to (that is, mapped with) the holdable controller and a menu desired to select in the virtual reality content and ③ the user pressing an actual physical button on the holdable controller so that ④ the virtual hand in the virtual reality content presses the menu in the virtual reality content to achieve an action of selection.

As another example, an action of holding a virtual object inside the virtual reality content is achieved by ① the user moving the holdable controller by the user to ② overlap a virtual hand in the virtual reality content corresponding to (mapped with) the holdable controller and the virtual object and ③ the user continuing to press the actual physical button on the holdable controller so that the action of holding the virtual object by the virtual hand in the virtual reality content is achieved.

However, the interaction between the user and the content/the user and the virtual object based on the holdable controller has a limitation of degrading the user's immersion in virtual reality content.

This is because the user feels more convinced and more immersed when the action of selecting the user menu displayed by the virtual reality content is achieved by ① the user moving a user's real hand to ② overlap a virtual hand in the virtual reality content corresponding to the user's real hand and the menu to be selected in the virtual reality content and ③ pushing the user's real hand forward such ④ that the virtual hand in the virtual reality content presses the menu in the virtual reality content to achieve the action of selection.

That is, the difference between the user's action in the real world and the user's action in the virtual world hinders immersion for a user in the content.

In order to solve the problem, virtual reality device developers are putting in effort to embed multiple cameras in the front side of the HMD and track the shape of the user's real hand on the basis of images acquired through the cameras.

In detail, the hand is detected by image analysis, the detected hand is abstracted into a set of hand joints, and three-dimensional (3D) position/rotation values of the joints are transferred to the virtual reality content.

When the 3D position/rotation values of the user's hand joints are provided as above, virtual reality content developers convert the values to render a virtual hand in the virtual reality content.

With such a configuration, a user may see the virtual hand that currently matches his/her hand in shape in the virtual reality content so that the user comes to have a higher sense of immersion compared to the interaction based on the holdable controller.

The 3D position/rotation values of the hand joints acquired through the cameras on the front side of the HMD may be rendered as a virtual hand in the virtual reality content, but it is difficult to recognize a hand gesture (e.g., pushing, pulling, sliding sideways, etc.) performed by the virtual hand.

In order to recognize the hand gesture, a high-accuracy recognizer is required. Recently, a deep learning-based user hand gesture recognition method is widely used.

That is, there is a need for development of a deep learning-based user hand gesture recognizer that, when 3D position/rotation values of hand joints acquired through a HMD front camera are given as input, provides a user hand gesture as a result.

However, such a method of acquiring hand data on the basis of a HMD front camera cannot acquire hand data when the user's hand is out of the field of view of the camera due to difficulty in finding the user's hand.

Therefore, a method of acquiring user hand data by allowing a user to wear a data glove or a thimble or a method of installing a separate red-green-blue (RGB)/red-green-blue-depth (RGBD)/Infrared (IR) camera or an ultrasonic sensor around a user in order to acquire user hand data is among the popular methods.

As such, there are various methods of acquiring user hand data, and each method has a different form of user hand data, which presents a need to separately generate a deep learning-based user hand gesture recognizer and acquire a sufficient amount of user hand data for each user hand data acquisition method.

However, processes of acquiring user hand data and training and generating a deep learning-based user hand gesture recognizer cause a long time and great economic cost.

The present invention is proposed to obviate the above-described limitations and provides a system for developing a new deep learning-based user hand gesture recognizer that allows the existing deep learning-based user hand gesture recognizer developed on the basis of a specific hand data acquisition method (e.g., an HMD front camera-based hand data acquisition method) to be applicable to other hand data acquisition methods (e.g., a data glove-based hand data acquisition method) only by constructing a small amount of dataset using transfer learning and providing virtual reality content using the new deep learning-based user hand gesture recognizer.

According to the present invention, a system for providing virtual reality content on the basis of a user hand gesture may be provided by generating, managing, and applying a new deep learning user hand gesture recognizer generated using transfer learning.

Figure 2:
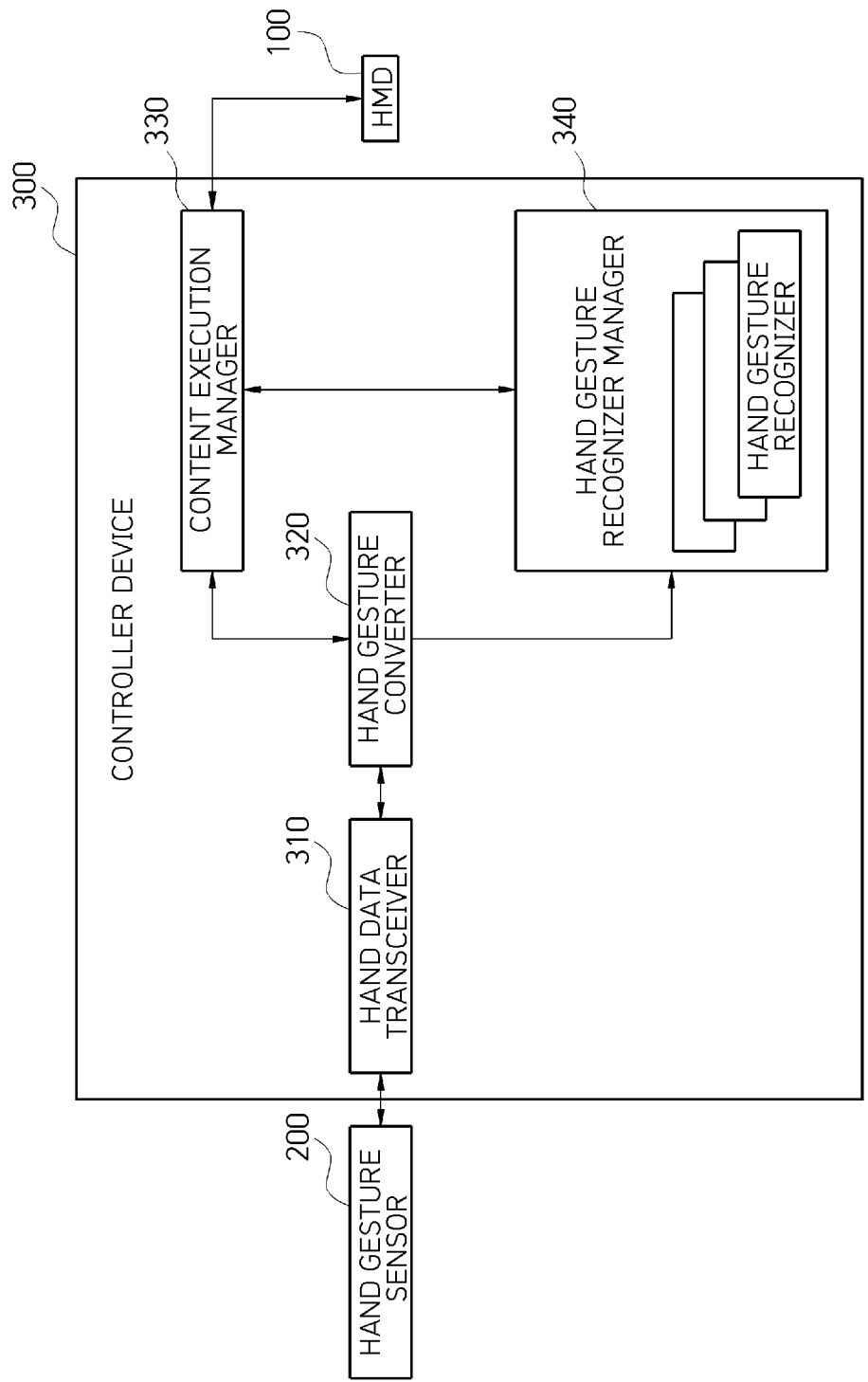

FIGS. 1 and 2 illustrate a system for recognizing a user hand gesture and providing virtual reality content based on deep learning using transfer learning according to an embodiment of the present invention.

The system for recognizing a user hand gesture and providing virtual reality content based on deep learning using transfer learning includes a device (i.e., a head mounted display (HMD)) configured to display hand gesture-based virtual reality content to the user, a hand gesture sensor 200 provided in various types and configured to acquire hand data of a user, and a controller device 300 configured to transmit and receive hand gesture data, convert the hand gesture data, manage a user hand gesture recognizer on the basis of deep-learning, and content execution management.

The HMD 100 receives content through generation of a user hand gesture recognizer based on deep learning using transfer learning or user hand gesture recognition-based user content from the controller device 300 and renders virtual reality content in front of the user's eyes.

The hand gesture sensor 200 is a user hand data acquisition device that is determined in consideration of content execution environment and user convenience and includes one of various types of hand gesture sensors.

For example, the hand gesture sensor 200 may acquire hand data on the basis of a plurality of cameras arranged on the front side of the HMD 100, acquire hand data on the basis of a data glove or thimble worn by the user, or acquire hand data through a separate RGB/RGBD/IR camera or an ultrasonic sensor.

The controller device 300 communicates with the hand gesture sensor 200 to transmit and receive user hand data and haptic data, converts the received data into hand gesture data, performs user hand gesture recognition using a deep learning-based hand gesture recognizer, executes virtual reality content on the basis of the user hand gesture, and transmits the executed virtual reality content to the HMD 100.

In the HMD 100, RGB cameras for a pass-through mode, spatial/object recognition, or interaction using a user's hand are arranged on the front surface of the exterior of the structure of the HMD 100.

On an inner side of a portion of the exterior of the structure of the HMD 100 against which the user's eyes are pressed, a full display area is provided in the form of a screen through a display panel device such as a flat panel display, a liquid crystal display, or the like.

The HMD 100 may take the form of an all-in-one HMD that exchanges data and content through wired/wireless communication with the controller device 300 and has a built-in computer or a tethered HMD using an external computer, and the HMD 100 is not restricted by a communication type and the form of including a computer device to be embed or externally connected.

When a content execution manager 330 of the controller device 300 executes "deep learning-based user hand gesture recognizer generation content using transfer learning," the display of the HMD 100 renders virtual reality content for constructing a user hand gesture dataset in front of the user's eyes.

When the content execution manager 330 of the controller device 300 executes "user hand gesture recognition-based user content," the display of the HMD 100 renders virtual reality content based on a user hand gesture recognition in front of the user's eyes.

That is, the user receives information and content generated during execution of a user hand gesture-based virtual reality service through the content rendered on the display of the HMD 100.

The hand gesture sensor 200 may be provided using any of a non-contact type device and a contact type device as described above.

Examples of the non-contact type device include an RGB camera included in the front side of the HMD 100 worn by the user or include an RGB/RGBD/IR camera or an ultrasonic sensor separately installed at the outside of the HMD 100.

The hand gesture sensor 200 provided in a non-contact type analyzes image data acquired by the camera or sound wave data acquired by the ultrasonic sensor to calculate three dimensional (3D) position/rotation values of the hand joints of the user.

Examples of the contact type device may include a data glove or a thimble worn on the hand of the user, and the hand gesture sensor 200 provided in a contact type calculates 3D position/rotation values of the hand joints of the user through a flexible sensor, an inertial sensor unit (IMU), and the like included in the data glove.

The hand gesture sensor 200 transmits and receives hand data through wired/wireless communication to and from the controller device 300 and transmits haptic data to the user according to the characteristics of the content and the function of the hand gesture sensor 200.

The content execution manager 300 includes a hand data transceiver 310 configured to exchange data with the hand gesture sensor 200, a hand gesture data converter 320 configured to convert received user hand data into hand gesture data, a hand gesture recognizer manager 340 configured to manage hand gesture recognizers trained for various types of user hand gesture data, and a content execution manager 330 configured to determine content that is to be executed according to the presence or absence of a hand gesture recognizer corresponding to hand gesture data and share the determined content with the HMD 100.

According to an embodiment of the present invention, the hand gesture sensor 200 serves as an input device for hand data of the user, the HMD 100 serves as an output device for delivering a result to the sight of the user, and the controller device 300 serves as a central processing unit and a control unit that perform hand data processing, content execution, and input/output device management.

The hand data transceiver 310 receives hand data (3D position and rotation values of hand joints, etc.) transmitted from the hand gesture sensor 200 and transmits haptic data received from the content execution manager 330 to the hand gesture sensor 200.

The hand data transceiver 310 performs connection state management for data transmission/reception between the hand gesture sensor 200 and the controller device 300, and the data transmission/reception is not restricted by the form of wired communication and wireless communication (e.g., Wi-Fi, Bluetooth, radio frequency (RF), etc.)

The hand data represents the shape of a hand at any one moment, but a hand gesture is spatio-temporal data in which hand shapes and trajectories of a number of moments are accumulated.

The hand gesture data converter 320 accumulates the pieces of hand data of the user received for a predetermined period of time and converts the accumulated pieces of hand data into hand gesture data.

The hand gesture recognizer requires a fixed length of input but hand gestures vary in length depending on the type of gesture (e.g., a hand gesture of pushing occurs in a short moment, and a hand gesture of shaking occurs for a relatively long period of time).

Accordingly, the hand gesture data converter 320 performs conversion such that different user hand gestures have a fixed length through interpolation.

That is, the hand gesture data converter 320 converts hand data into hand gesture data using accumulation and interpolation.

The hand gesture recognizer manager 340 manages a plurality of hand gesture recognizers.

The hand gesture recognizer manager 340 receives the hand gesture data from the hand gesture data converter 320, and according to the presence or absence of a hand gesture recognizer that derives a hand gesture recognition result, transmits a hand gesture recognition result (e.g., pushing, shaking, etc.) or a hand gesture recognizer absence result to the content execution manager 330.

At the time when the system for providing virtual reality content according to the embodiment of the present invention is initially constructed, the hand gesture recognizer manager 340 does not have a hand gesture recognizer.

In response to reception of hand gesture data from the hand gesture data converter 320, a user hand gesture recognizer absence result is transmitted to the content execution manager 330, and the content execution manager 330 generates a single hand gesture recognizer as a result of executing the "deep learning-based user hand gesture recognizer generation content using transfer learning" and transmits the generated single hand gesture recognizer to the hand gesture recognizer manager 340.

That is, as the hand gesture recognizer manager 340 and the content execution manager 330 perform respective roles and cooperate with each other, the hand gesture recognizer is generated, and the generated hand gesture recognizer is managed by the hand gesture recognizer manager 340.

The content execution manager 330, in response to receiving a user hand gesture recognition result from the hand gesture recognizer manager 340, executes the "hand gesture recognition-based user content," and in response to receiving a user hand gesture recognizer absence result from the hand gesture recognizer manager 340, executes the "deep learning-based user hand gesture recognizer generation content using transfer learning."

In the virtual reality content, in order to interact with the user, the current shape or pose of a user hand needs to be rendered in the content. The latest user hand data of the hand gesture data received from the hand gesture data converter 320 is used for rendering of a hand in the content.

The virtual reality content is shared with the HMD 100 through the content execution manager 330, and the user comes to receive information generated during execution of a hand gesture-based virtual reality service through the virtual reality content rendered on the display of the HMD 100.

Figure 3:
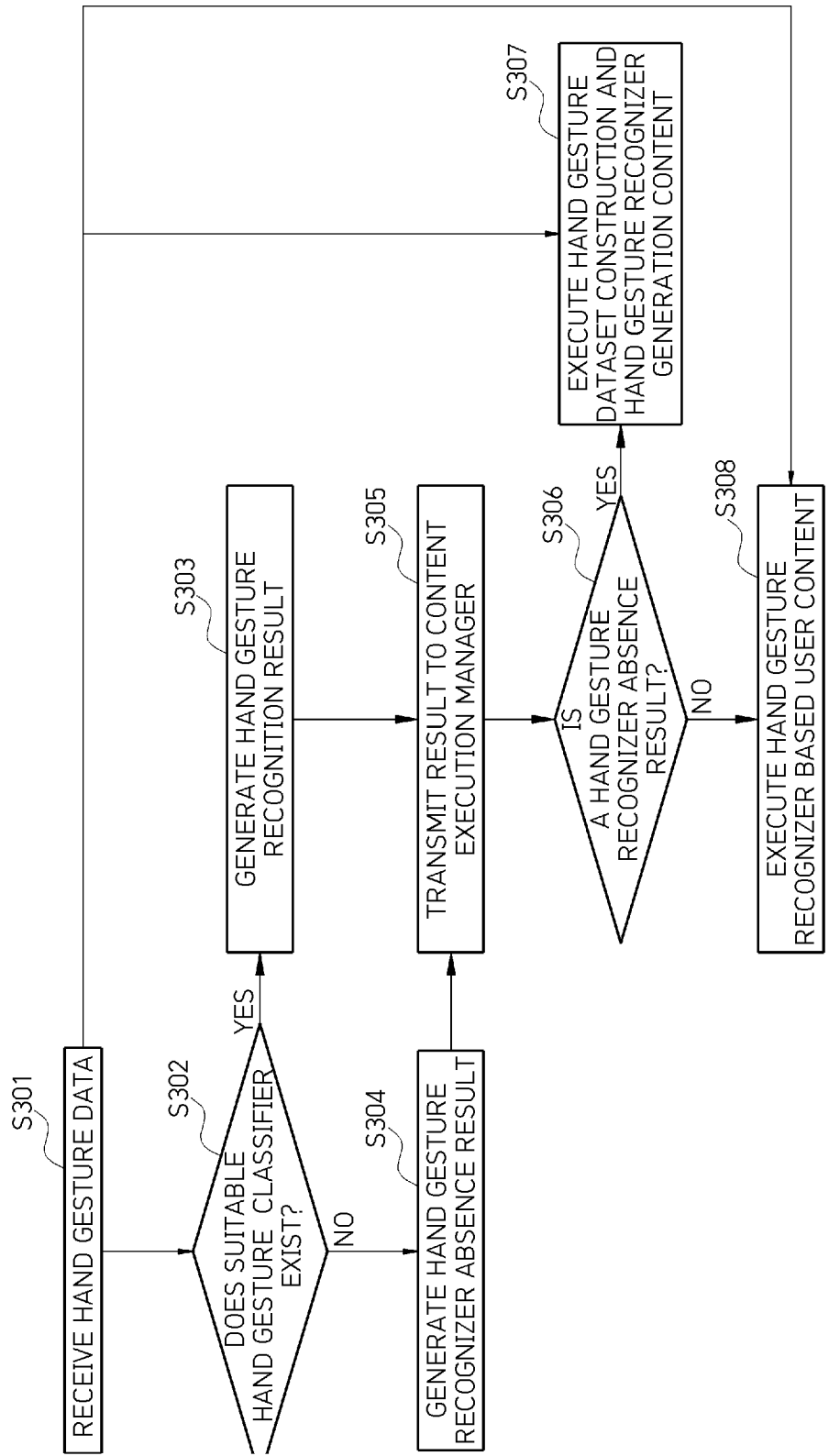
FIGS. 3 and 4 illustrate a method of recognizing a user hand gesture and providing virtual reality content based on deep learning using transfer learning according to an embodiment of the present invention.
Figure 4:
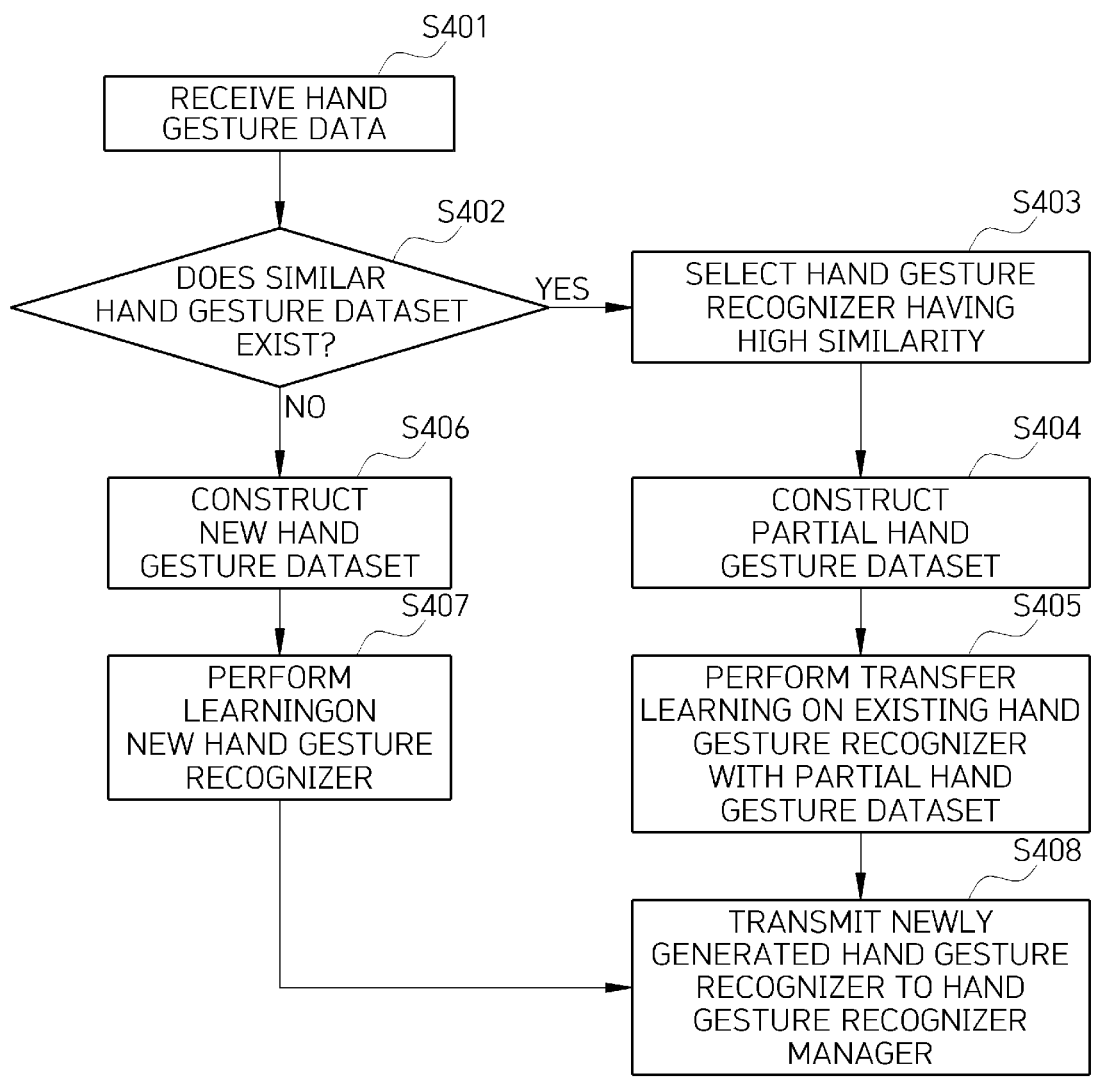

FIGS. 3 and 4 illustrate a method of recognizing a user hand gesture and providing virtual reality content based on deep learning using transfer learning according to an embodiment of the present invention.

When hand gesture data is received (S301), whether a hand gesture recognizer capable of deriving a hand gesture recognition result from the hand gesture data exists is checked (S302).

In a result of operation S302, it is checked that a hand gesture recognizer capable of processing the hand gesture data exists, a hand gesture recognition operation is performed such that a hand gesture recognition result, such as of pushing and shaking, is generated (S303), and the hand gesture recognition result is transmitted to the content execution manager (S305) and is used for user hand gesture recognition-based user content.

In the result of operation S302, it is checked that a hand gesture recognizer capable of processing the hand gesture data does not exist, a user hand gesture recognizer absence result is generated as an intermediate result (S304) and is transmitted to the content execution manager (S305) such that deep learning-based user hand gesture recognizer generation content using transfer learning is executed.

Whether the hand gesture recognition result corresponds to a hand gesture recognizer absence result is checked and execution content is determined (S306).

In the case of having a hand gesture recognition result in operation S306 of determining execution content, the latest hand data of the hand gesture data is combined into the hand rendering in the content so as to execute the hand gesture recognition-based user content (S308).

In the case of having a hand gesture recognizer absence result in operation S306 of determining execution content, the latest hand data of the hand gesture data is combined into the hand rendering in the content to execute the "deep learning-based user hand gesture recognizer generation content using transfer learning" (S307).

Referring to FIG. 4, when the "deep learning-based user hand gesture recognizer generation content using transfer learning" is executed and hand gesture data is received (S401), the similarity between the received hand gesture data and the existing user hand gesture datasets is compared (S402).

The comparing of the similarity in operation S402 includes comparing how similar the data format of the received hand gesture data is to the data format of the hand gesture data of the existing hand gesture dataset, and the comparison result has a value in a range of 0.0 and 1.0.

That is, one of the existing user hand gesture datasets having the highest similarity comparison analysis result value is selected as a candidate dataset to be used for transfer learning.

In operation S402, when the similarity comparison analysis result value of the selected candidate dataset is less than a threshold value, it is identified that a similar hand gesture dataset does not exist, and a new hand gesture dataset for training a deep learning hand gesture recognizer is constructed (S406).

In operation S406, the number of attempts to input hand gestures by the user needs to be greater than or equal to a minimum hand gesture dataset size N that is required for training a deep learning-based user hand gesture recognizer.

When the construction of the new hand gesture dataset is completed in operation S406, a new deep learning-based user hand gesture recognizer is trained and generated using the new hand gesture dataset (S407).

In operation S402, when the similarity comparison analysis result value of the selected candidate dataset is greater than the threshold value, a candidate user hand gesture recognizer having a high similarity among the existing user hand gesture recognizers is selected (S403).

The candidate user hand recognizer may be selected as a user hand recognizer trained with the candidate dataset selected in operation S402 among the existing user hand recognizers.

When the candidate user hand gesture recognizer is selected, a partial user hand gesture dataset to be used for transfer learning is constructed (S404).

Since the candidate user hand gesture recognizer has input data similar to the received user hand gesture data, a new user hand gesture recognizer for the received user hand gesture data may be generated with only a small amount of datasets using transfer learning.

A process of constructing the partial hand gesture dataset in consideration of the similarity comparison analysis result value derived in operation S402 is performed, and the number of attempts of user hand gestures to be input in the process of constructing the partial user hand gesture dataset is greater than or equal to a value obtained by multiplying the minimum hand gesture dataset size N required for training the deep learning-based user hand gesture recognizer by a value of one minus the similarity comparison analysis result value.

That is, the size of the partial hand gesture dataset needs to be greater than or equal to {N×(1-similarity comparison analysis result value)}.

This is because, in the case of using transfer learning, the higher similarity between the input data of the candidate user hand gesture recognizer and the received hand gesture data is, the smaller training dataset required for transfer learning is.

When the construction of the user hand gesture partial dataset is completed as such, a new deep learning-based user hand gesture recognizer is trained and generated through transfer learning (S405)

Figure 5:
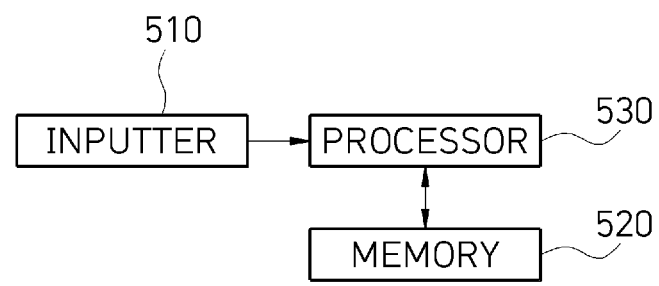
FIG. 5 illustrates an apparatus for recognizing a user hand gesture and providing virtual reality content based on deep learning using transfer learning according to an embodiment of the present invention.

FIG. 5 illustrates an apparatus for recognizing a user hand gesture and providing virtual reality content based on deep learning using transfer learning according to an embodiment of the present invention.

The apparatus for recognizing a user hand gesture and providing virtual reality content based on deep learning using transfer learning according to the embodiment of the present invention includes an inputter 510 configured to receive hand data, a memory 520 in which a program for providing virtual reality content using the hand data is stored, and a processor 530 configured to execute the program, wherein the processor 530 receives the hand data and converts the received hand data into hand gesture data, manages a hand gesture recognizer on the basis of deep learning, and performs content execution management.

The hand data is acquired using at least one of a camera disposed on a front surface of a HMD, a data glove worn by a user, a thimble worn by a user, or a separately disposed camera.

The processor 530 performs accumulation and interpolation on a different piece of the hand data to convert the different piece of the hand data into the hand gesture data.

The processor 530 outputs a recognition result according to the presence or absence of the hand gesture recognizer that derives a hand gesture recognition result using the hand gesture data.

The processor 530, in response to a result output of absence of the hand gesture recognizer with respect to the hand gesture data, executes content for generating a deep learning-based user hand gesture recognizer using transfer learning.

The processor 530 compares the similarity between the hand gesture data and the existing hand gesture datasets to select a candidate dataset to be used for the transfer learning and uses a similarity comparison analysis result value of the candidate dataset to construct a new hand gesture dataset to perform learning on the deep learning-based hand gesture recognizer or select a candidate user hand gesture recognizer and construct a partial user hand gesture dataset to be used for transfer learning.

The processor 530, in response to output of the hand gesture recognition result for the hand gesture data, executes hand gesture recognition-based user content.

Meanwhile, the method of recognizing a user hand gesture and providing virtual reality content based on deep learning using transfer learning according to the embodiment of the present invention may be implemented in a computer system or recorded on a recording medium. The computer system may include at least one processor, a memory, a user input device, a data communication bus, a user output device, and a storage. The above-described components perform data communication through the data communication bus.

The computer system may further include a network interface coupled to a network. The processor may be a central processing unit (CPU) or a semiconductor device for processing instructions stored in the memory and/or storage.

The memory and the storage may include various forms of volatile or nonvolatile media. For example, the memory may include a read only memory (ROM) or a random-access memory (RAM).

Accordingly, the method of recognizing a user hand gesture and providing virtual reality content based on deep learning using transfer learning according to the embodiment of the present invention may be implemented in a computer-executable form. When the method of recognizing a user hand gesture and providing virtual reality content based on deep learning using transfer learning according to the embodiment of the present invention is performed by the computer, instructions readable by the computer may perform the method of recognizing a user hand gesture and providing virtual reality content based on deep learning using transfer learning according to the embodiment of the present invention.

Meanwhile, the method of recognizing a user hand gesture and providing virtual reality content based on deep learning using transfer learning according to the embodiment of the present invention may be embodied as computer readable code on a computer-readable recording medium. The computer-readable recording medium is any recording medium that can store data that can be read by a computer system. Examples of the computer-readable recording medium include a ROM, a RAM, a magnetic tape, a magnetic disk, a flash memory, an optical data storage, and the like. In addition, the computer-readable recording medium may be distributed over network-connected computer systems so that computer readable code may be stored and executed in a distributed manner.

As is apparent from the above, in constructing a user hand gesture-based virtual reality service, deep learning-based hand gesture recognizers are generated and managed using transfer learning, thereby providing a user hand gesture-based virtual reality service compatible with various types of user hand data acquisition devices.

When generating a new deep learning-based user hand gesture recognizer through transfer learning for a new user hand data acquisition device, the size of a new hand gesture dataset additionally required is optimized as a partial hand gesture dataset according to a similarity analysis result with the existing deep learning-based user hand gesture recognizer so that the cost for constructing training data and the time required for training and generating the recognizer can be minimized.

The effects of the present invention are not limited to those described above, and other effects not described above will be clearly understood by those skilled in the art from the above detailed description.

The components described in the example embodiments may be implemented by hardware components including, for example, at least one digital signal processor (DSP), a processor, a controller, an application-specific integrated circuit (ASIC), a programmable logic element, such as an FPGA, other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software.

The method according to example embodiments may be embodied as a program that is executable by a computer, and may be implemented as various recording media such as a magnetic storage medium, an optical reading medium, and a digital storage medium.

Various techniques described herein may be implemented as digital electronic circuitry, or as computer hardware, firmware, software, or combinations thereof. The techniques may be implemented as a computer program product, i.e., a computer program tangibly embodied in an information carrier, e.g., in a machine-readable storage device (for example, a computer-readable medium) or in a propagated signal for processing by, or to control an operation of a data processing apparatus, e.g., a programmable processor, a computer, or multiple computers. A computer program(s) may be written in any form of a programming language, including compiled or interpreted languages and may be deployed in any form including a stand-alone program or a module, a component, a subroutine, or other units suitable for use in a computing environment. A computer program may be deployed to be executed on one computer or on multiple computers at one site or distributed across multiple sites and interconnected by a communication network.

Processors suitable for execution of a computer program include, by way of example, both general and special purpose microprocessors, and any one or more processors of any kind of digital computer. Generally, a processor will receive instructions and data from a read-only memory or a random access memory or both. Elements of a computer may include at least one processor to execute instructions and one or more memory devices to store instructions and data. Generally, a computer will also include or be coupled to receive data from, transfer data to, or perform both on one or more mass storage devices to store data, e.g., magnetic, magneto-optical disks, or optical disks. Examples of information carriers suitable for embodying computer program instructions and data include semiconductor memory devices, for example, magnetic media such as a hard disk, a floppy disk, and a magnetic tape, optical media such as a compact disk read only memory (CD-ROM), a digital video disk (DVD), etc. and magneto-optical media such as a floptical disk, and a read only memory (ROM), a random access memory (RAM), a flash memory, an erasable programmable ROM (EPROM), and an electrically erasable programmable ROM (EEPROM) and any other known computer readable medium. A processor and a memory may be supplemented by, or integrated into, a special purpose logic circuit.

The processor may run an operating system (OS) and one or more software applications that run on the OS. The processor device also may access, store, manipulate, process, and create data in response to execution of the software. For purpose of simplicity, the description of a processor device is used as singular; however, one skilled in the art will be appreciated that a processor device may include multiple processing elements and/or multiple types of processing elements. For example, a processor device may include multiple processors or a processor and a controller. In addition, different processing configurations are possible, such as parallel processors.

Also, non-transitory computer-readable media may be any available media that may be accessed by a computer, and may include both computer storage media and transmission media.

The present specification includes details of a number of specific implements, but it should be understood that the details do not limit any invention or what is claimable in the specification but rather describe features of the specific example embodiment. Features described in the specification in the context of individual example embodiments may be implemented as a combination in a single example embodiment. In contrast, various features described in the specification in the context of a single example embodiment may be implemented in multiple example embodiments individually or in an appropriate sub-combination. Furthermore, the features may operate in a specific combination and may be initially described as claimed in the combination, but one or more features may be excluded from the claimed combination in some cases, and the claimed combination may be changed into a sub-combination or a modification of a sub-combination.

Similarly, even though operations are described in a specific order on the drawings, it should not be understood as the operations needing to be performed in the specific order or in sequence to obtain desired results or as all the operations needing to be performed. In a specific case, multitasking and parallel processing may be advantageous. In addition, it should not be understood as requiring a separation of various apparatus components in the above described example embodiments in all example embodiments, and it should be understood that the above-described program components and apparatuses may be incorporated into a single software product or may be packaged in multiple software products.

It should be understood that the example embodiments disclosed herein are merely illustrative and are not intended to limit the scope of the invention. It will be apparent to one of ordinary skill in the art that various modifications of the example embodiments may be made without departing from the spirit and scope of the claims and their equivalents.

What is claimed is:

1. A system of recognizing a user hand gesture and providing virtual reality content based on deep learning using transfer learning, the system comprising:
    a head mounted display (HMD) configured to display, to a user, virtual reality content based on a hand gesture;
    a hand gesture sensor configured to acquire hand data of the user; and
    a controller device configured to receive the hand data and convert the received hand data into hand gesture data, manage a hand gesture recognizer on the basis of deep learning, and perform content execution management,
    wherein the controller device compares a similarity between the hand gesture data and existing hand gesture datasets to select a candidate dataset to be used for the transfer learning and uses a similarity comparison analysis result value of the candidate dataset to construct a new hand gesture dataset.

2. The system of claim 1, wherein the hand gesture sensor transmits the hand data, which is acquired using at least one of a camera disposed on a front surface of the HMD, a data glove worn by the user, a thimble worn by the user, or a separately disposed camera, to the controller device.

3. The system of claim 1, wherein the controller device transmits and receives the hand data and haptic data to and from the hand gesture sensor.

4. The system of claim 1, wherein the controller device performs accumulation and interpolation on a different piece of the hand data to convert the different piece of the hand data into the hand gesture data.

5. The system of claim 1, wherein the controller device outputs a recognition result according to a presence or absence of the hand gesture recognizer that derives a hand gesture recognition result using the hand gesture data.

6. The system of claim 5, wherein the controller device, in response to a result output of absence of the hand gesture recognizer with respect to the hand gesture data, executes content for generating a deep learning-based user hand gesture recognizer using transfer learning.

7. The system of claim 6, wherein the controller device further performs learning on the deep learning-based hand gesture recognizer or selects a candidate user hand gesture recognizer and constructs a partial user hand gesture dataset to be used for transfer learning.

8. The system of claim 5, wherein the controller device, in response to output of the hand gesture recognition result for the hand gesture data, executes hand gesture recognition-based user content.

9. The system of claim 5, wherein the controller device uses latest user hand data of the hand gesture data to render a hand in the content.

10. A method of recognizing a user hand gesture and providing virtual reality content based on deep learning using transfer learning, the method comprising the steps of:
    (a) receiving hand data and converting the received hand data into hand gesture data;
    (b) identifying whether a suitable hand gesture classifier exists using the hand gesture data;
    (c) when it is identified in the step (b) that the suitable hand gesture classifier does not exist, executing content for generating a deep learning-based hand gesture recognizer using transfer learning, and when it is identified in the step (b) that the suitable hand gesture classifier exists, executing hand gesture recognition-based user content; and
    (d) comparing a similarity between the hand gesture data and existing hand gesture datasets to select a candidate dataset to be used for the transfer learning and uses a similarity comparison analysis result value of the candidate dataset to construct a new hand gesture dataset.

11. An apparatus for recognizing a user hand gesture and providing virtual reality content based on deep learning using transfer learning, the apparatus comprising:
    an inputter configured to receive hand data;
    a memory in which a program for providing virtual reality content using the hand data is stored; and
    a processor configured to execute the program,
    wherein the processor receives the hand data and converts the received hand data into hand gesture data, manages a hand gesture recognizer on the basis of deep learning, and performs content execution management,
    wherein the processor compares a similarity between the hand gesture data an existing hand gesture datasets to select a candidate dataset to be used for the transfer learning and uses a similarity comparison analysis result value of the candidate dataset to construct a new hand gesture dataset.

12. The apparatus of claim 11, wherein the hand data is acquired using at least one of a camera disposed on a front surface of a head mounted display (HMD), a data glove worn by a user, a thimble worn by a user, or a separately disposed camera.

13. The apparatus of claim 11, wherein the processor performs accumulation and interpolation on a different piece of the hand data to convert the different piece of the hand data into the hand gesture data.

14. The apparatus of claim 11, wherein the processor outputs a recognition result according to a presence or absence of the hand gesture recognizer that derives a hand gesture recognition result using the hand gesture data.

15. The apparatus of claim 14, wherein the processor, in response to a result output of absence of the hand gesture recognizer with respect to the hand gesture data, executes content for generating a deep learning-based user hand gesture recognizer using transfer learning.

16. The apparatus of claim 15, wherein the processor further performs learning on the deep learning-based hand gesture recognizer or selects a candidate user hand gesture recognizer and construct a partial user hand gesture dataset to be used for transfer learning.

17. The apparatus of claim 14, wherein the processor, in response to output of the hand gesture recognition result for the hand gesture data, executes hand gesture recognition-based user content.

* * * * *